United States Patent [19]

Miller

[11] 4,345,660
[45] Aug. 24, 1982

[54] VEHICLE EMERGENCY STEERING SYSTEM

[75] Inventor: Wayne R. Miller, Dubuque, Iowa
[73] Assignee: Deere & Company, Moline, Ill.
[21] Appl. No.: 106,831
[22] Filed: Dec. 26, 1979
[51] Int. Cl.³ .................................... B62D 5/006
[52] U.S. Cl. ................................ 180/133; 60/405; 340/52 R; 340/516
[58] Field of Search .............. 180/133, 271; 605/405; 340/52 R, 52 D, 514, 516

[56] References Cited

U.S. PATENT DOCUMENTS

| | | | |
|---|---|---|---|
| 2,954,671 | 10/1960 | Kress | 60/405 |
| 3,820,620 | 6/1974 | Miller | 180/133 |
| 3,913,324 | 10/1975 | Miller et al. | 60/405 |
| 3,921,748 | 11/1975 | Dunn | 180/79.2 R |
| 3,940,931 | 3/1976 | Renfro et al. | 60/403 |
| 4,079,806 | 3/1978 | Hoag et al. | 180/133 |
| 4,102,129 | 7/1978 | Maes | 60/403 |

Primary Examiner—Joseph F. Peters, Jr.
Assistant Examiner—M. J. Hill

[57] ABSTRACT

An emergency or backup steering system includes a backup pump which is driven by an electric motor. A control circuit for the motor automatically energizes it upon the main supply of hydraulic power steering fluid becoming inadequate for normal steering operation. The control circuit provides for checkout of the portions thereof governing actuation of the backup system and provides for indicating failure in the backup system of both the electrical and hydraulic portions thereof.

3 Claims, 1 Drawing Figure

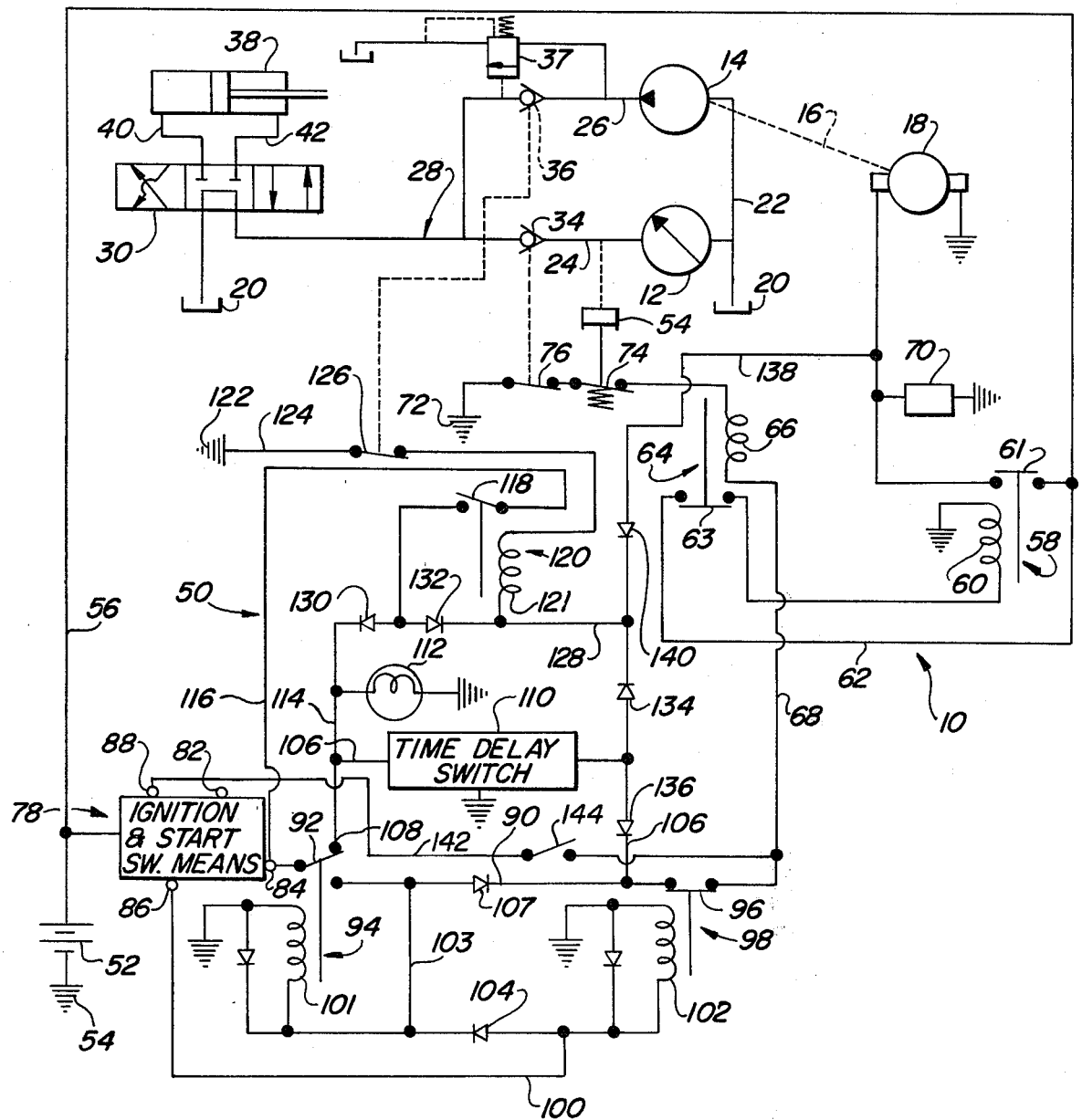

VEHICLE EMERGENCY STEERING SYSTEM

BACKGROUND OF THE INVENTION

The present invention relates to an electrohydraulic control system for a backup hydraulic power steering system and more particularly relates to improvements in the control system disclosed in U.S. Pat. No. 3,820,620 issued to Miller et al. on June 28, 1974.

The patented control system includes electrical circuitry for automatically checking out the electrical power circuit of the backup system and for arming the circuit for subsequent automatic energization of the backup system upon failure of the main power steering system, during each starting cycle of the vehicle ignition switch means. Operability of the power circuit is indicated by a flashing light or some other warning device and a light becomes lit whenever the system is properly armed.

The patented control system has the following drawbacks:
1. The circuitry does not provide any means for apprising the operator of a failure of the backup steering system to supply adequate steering fluid.
2. The arming indicator light is always lit when the arming circuit is energized and may become subconsciously ignored by the operator.
3. The arming circuit may become inadvertently disarmed by an operator who turns the ignition switch "off" then back "on" again before the flywheel action of the engine ceases thus resulting in the engine continuing to run for operating the vehicle without the backup steering system being readied for automatic operation in the event of failure of the main steering system.

SUMMARY OF THE INVENTION

According to the present invention, there is provided an improved electrohydraulic control system for a backup hydraulic power steering system.

An object of the invention is to provide backup power steering control circuitry embodying circuitry for automatically checking out the mechanical and electrical integrity of the backup steering system as well as indicating the occurrence of a failure in the main steering system.

A more specific object is to provide a backup power steering control system including circuitry embodying an indicator which is energized any time a circuit for supplying current for driving the backup steering pump drive motor is disarmed or when there has been a failure of the backup steering pump to deliver adequate power steering fluid after the vehicle has been started.

Yet a more specific object is to provide an indicator, as set forth in the immediately preceding object, wherein current flows to the backup system failed indicator via first and second current paths respectively before and after failure of the main steering system.

These and other objects will become apparent from a reading of the following description together with the appended drawings.

BRIEF DESCRIPTION OF THE DRAWING

The sole FIGURE is a schematic representation of a hydraulic power steering system embodying a backup steering control system constructed in accordance with the present invention.

DESCRIPTION OF THE PREFERRED EMBODIMENT

Referring now to the drawing, therein is shown a combined main and backup or safety hydraulic power steering system indicated in its entirety by the reference numeral 10. The steering system 10 includes a variable displacement, constant pressure main pump 12 and a fixed displacement backup pump 14. The main pump 12 is preferably coupled to be driven directly from the vehicle engine (not shown) in a manner conventional in the art while the backup pump 14 is conventionally coupled, as represented by the dashed line 16, for being driven by an electric motor 18. The main and backup pumps 12 and 14 have respective inlets coupled to a sump 20 by means of a branched suction conduit 22 and have respective outlets coupled to parallel branches 24 and 26 of a branched feed conduit 28, which is coupled to an open-center steering control valve 30. Respectively located in the branches 24 and 26 are one-way check valves 34 and 36, which respectively operate to isolate the pump 12 from the pump 14 and vice versa. Preferably, the valves 34 and 36 are constructed as flow sensing valves for purposes set forth hereinbelow, it being noted that a suitable flow sensing valve is illustrated and described in full detail in U.S. Pat. No. 3,890,995 issued to Miller et al. on June 24, 1975 and incorporated herein in its entirety.

An unloading valve 37 is coupled in the branch 26 for unloading fluid supplied by the fixed displacement backup pump 14 when no steering fluid is being used.

The steering control valve 30 is here shown in a centered position wherein it connects the outputs of the pumps 12 and 14 to the sump 20 and blocks flow to and from a steering actuator means, here shown in the form of a two-way hydraulic cylinder 38 having its opposite ends connected to the valve 30 by a pair of lines 40 and 42. The valve 30 would normally be connected to a steering wheel, or the like (not shown), in a conventional manner for effecting shifting of the valve one way or the other from its centered position respectively in response to turning the steering wheel one way and the other from a centered position.

The operation of the electric motor 18, and hence the operation of the backup pump 14, is controlled through means of an electrical control circuit designated in its entirety by the reference numeral 50. The circuit 50 includes a source of electrical current shown here as a battery 52 connected to ground at 54 and to a branched power lead 56. The lead 56 is connected to the electric motor 18 and located therein is a relay 58 having a coil 60 energizable to effect closing of a normally open contact 61. The coil 60 is located in a branch 62 of the lead 56 in which is also located a normally open contact 63 of a relay 64 having a stem encircled by a coil 66 located in a control current lead 68. Thus the relays 58 and 64 are stepped such that energization of the lead 68, in a manner described hereinafter, will effect closure of the contact 63 which then results in energization of the coil 60 and the consequent closure of the switch 58 to thereby energize the motor 18. A warning device 70, such as a buzzer, horn or flashing light is connected to the lead 56 at a location between the switch 58 and motor 18 so as to be energized to apprise the operator that the backup or emergency steering system is in operation.

Connected in series in the control current lead 68 between the coil 66 and a ground connection 72 are a normally closed pressure switch 74, which is connected for sensing pressure at a location in the conduit branch 24 between the pump 12 and the check valve 34, and a normally closed flow sensing switch 76, which is preferably embodied in the check valve 34 but shown separated here for the sake of simplicity. A combined ignition and start switch means 78 is connected to the power lead 56 and is manually operable for selectively connecting the lead 56 to "off", "on", "start" and "accessories" contacts 82, 84, 86 and 88, respectively, for initiating various possible paths of connection of the power lead 56 to the control current lead 68. It is to be understood that the switch means 78 operates such that the "on" contact is connected to the power lead 56 anytime that the "start" contact is connected to the power lead, the connection of the "start" contact to the power lead being a momentary operation as controlled by a normally open start button or a rotary switch, for example, as are well known in the art and schematically illustrated in the aforementioned U.S. Pat. No. 3,820,620.

A control current supply lead 90 is connected between the "on" contact 84 and the lead 68. Located in the lead 90 in series with each other are a normally open arming switch 92, forming part of an arming relay 94, and a normally closed cut-out switch 96, forming part of a relay 98. An arming current lead 100 is connected to the "start" contact 86 and connects relay coils 101 and 102, respectively of the relays 94 and 98, in parallel with each other, the coils 101 and 102 respectively encircling stems joined to the switches 92 and 94. Thus, the coils 101 and 102 are energized to effect closing of the switch 92 and opening of the switch 96 anytime the switch element in switch means 78 is moved into engagement with the start contact 86. A latching current lead 103 is connected to the lead 90 at a location between the switches 92 and 96 and to the lead 100 at a location between the coils 101 and 102. The lead 103 serves to convey current for maintaining the coil 101 energized after the switch means 78 becomes disconnected from its "start" position upon the vehicle engine starting. The current conveyed by the lead 103 is isolated from the coil 102 by a diode 104 located in the lead 100 between the coil 101 and the junction of the leads 100 and 103. Thus, it will be appreciated that once the vehicle engine is started and the switch means 78 connects the power lead 56 to the "on" contact 84, both of the switches 92 and 96 will be closed such as to make current available to the control current lead 68 for effecting energization of the pump 18 in the event that the switches 74 and 76 close as a result of a failure of the main steering pump 12.

The operator is apprised of the operability of the relays 58 and 64 and the operability of the electric motor 18 each time the operator turns "on" the ignition and start switch means 78 by moving its switch element (not shown) into engagement with the "on" contact 84. Specifically, there is provided a testing circuit including a test current lead 106 having one end connected to an unarmed contact 108, which is engaged by the arming switch 92 when the latter is in its normally open unarmed position, as shown. The other end of the test current lead 106 is connected to the control current supply lead 90 at a location between the latching current lead 103 and the cut-out switch 96. Provided in the lead 90 for preventing current flow from the lead 106 to the lead 103 is a diode 107. Located in the lead 106 is a time delay switch 110 of a type that normally is in an "off" condition establishing an open circuit in the lead 106 but which closes to complete a current flow path through the lead 106 for a predetermined interval upon receiving an electrical signal. Thus, it will be appreciated that when the switch means 78 is turned "on", the time delay switch 110 will be turned "on" for a predetermined interval to thereby complete a circuit through the lead 106 and current will flow through the normally closed cut-out switch 96 to the control current lead 68. Since the vehicle engine will not yet have been started, the main pump 12 will not be pumping and the normally closed pressure and flow sensing switches 74 and 76 will be closed, as illustrated, to thus complete a circuit through the lead 68. Consequently, the stepped relays 58 and 64 will be energized to ultimately effect completion of the circuit through the lead 56 resulting in operation of the motor 18 and the warning device 70.

A further circuit is provided for apprising the operator that either the arming switch 92 is not armed or that the backup pump 14 has failed. Specifically, an indicator light 112 is connected to the lead 106, at the input side of the time delay switch 110, by a lead 114. Thus, the light 112 is lit any time the switch 78 is in its "on" condition and the switch 92 is unarmed. A further lead 116 is connected between the "on" contact 84 and the lead 114 for conveying power to the light 112 when the switch 92 is armed and a failure of the backup pump 14 occurs. To this end, the lead 116 contains a normally open switch 118, forming part of a latching relay 120 and having a stem fixed thereto which is encircled by a coil 121 connected to ground, as at 122, by a lead 124 containing a normally closed flow sensing switch 126, preferably embodied in the check valve 36. Power is supplied to the relay 120 by a lead 128 having one end joined to the lead 116 at a location between the switch 118 and the light 112 and having another end joined to the lead 106 at the output side of the time delay switch 110. It will be appreciated then that power will be available at the output of the time delay switch 110 to effect energization of the relay 120 in the event that the backup pump 14 is in a failed condition during the start-up test initiated by placing the switch 78 in its "on" position; and that once the switch 118 has closed, power will be supplied to the relay 120 by way of the lead 116. It is noted that a diode 130 is connected in the lead 116 between the light 112 and the junction of the leads 116 and 128 to prevent current flow to the relay 120 from the "on" contact 84 via the arming switch 92 while a diode 132 is connected in the lead 128 between the relay 120 and the junction of the leads 116 and 128 to prevent current flow to the light 112 from the output side of the time delay switch 110. Also, a diode 134 is connected in the lead 128 at the output side of the time delay switch 110 at a location preventing the flow of current to the lead 106.

Provided for energizing the relay 120 in the event of a failure of the pump 14 during operation of the backup steering system is a lead 138 having one end connected to the lead 56 at a location between the relay 58 and the motor 18 and having its other end connected to the lead 128 at a location between the relay 120 and diode 134. A diode 140 is connected in the lead 138 to prevent current from flowing from the lead 128 to the motor 18.

It will be appreciated then that after the relay 58 has closed the contact 61 to energize the motor 18, current will be available via the lead 138 to energize the relay 120 to effect closure of the switch 118 and the energization of the light 112.

It is to be noted that while the electrical control circuit is here shown as including various relays that equivalent solid state switches may be substituted therefor without departing from the scope of the invention.

The operation of the invention is thought clear from the foregoing description and for the sake of brevity it is not reiterated here. Suffice it to say that the electrical control circuit 50 operates such that an operator may operate the vehicle in confidence that backup steering will be available when needed and that if it is not available, he will be apprised of that fact whether the defect be in the motor 18, or circuitry for energizing the same, or in the backup pump 14.

I claim:

1. In a vehicle hydraulic power steering system including main and backup pumps, an electrically responsive drive for the backup pump and electric control circuitry for automatically effecting energization of the drive upon a failure of the main pump to output fluid adequate for normal steering operation and a test circuit between an "on" contact of a vehicle ignition and start switch means and the control circuitry to energize the electrically responsive drive when the switch means is placed in an "on" position before starting the vehicle, and said test circuit including a time delay switch which interrupts current flow through the test circuit a predetermined period after being energized, the improvement comprising: an electrically responsive backup pump failure indicating device; a first lead connecting said device to said "on" contact; a normally open switch connected to said first lead; means for closing said normally open switch; a second lead connecting said closing means to said time delay switch; a normally closed backup pump failure sensing switch serially connected with said closing means and said time delay switch whereby said closing means is actuated to close said normally open switch when said "on" contact is engaged, said backup pump is not operating and said time delay switch has not timed out; said normally open switch being serially connected with said closing means and said backup pump failure sensing switch whereby a failure of the backup pump to operate satisfactorily when the electrically responsive drive is being tested will be indicated by the continued energization of the failure indicating device, after the time delay switch has timed out.

2. The power steering system defined in claim 1 and further including a third lead connected between the "on" contact and the failure indicating device; said third lead including an electrically responsive arming switch means; and a fourth lead connected with a "start" contact of the ignition and start switch means and with the arming switch means for becoming energized to actuate the arming switch means to disconnect the "on" contact from the failure indicating device whereby the failure indicating device will serve to also indicate when the arming switch means is de-energized.

3. The power steering system defined in claim 1 wherein a fifth lead is connected between the electrically responsive drive and said means for closing said normally open switch for energizing and closing the latter to effect operation of the backup pump failure indicating device after the electrically responsive drive has been energized as a result of a failure of the main pump and a subsequent failure of the backup pump.

* * * * *